United States Patent
Wu et al.

(10) Patent No.: US 11,569,878 B2
(45) Date of Patent: Jan. 31, 2023

(54) PMI FEEDBACK FOR TYPE II CSI FEEDBACK IN NR-MIMO

(71) Applicant: QUALCOMM Incorporated, San Diego, CA (US)

(72) Inventors: Liangming Wu, Beijing (CN); Yu Zhang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 16/606,032

(22) PCT Filed: Jun. 8, 2017

(86) PCT No.: PCT/CN2017/087629
§ 371 (c)(1),
(2) Date: Oct. 17, 2019

(87) PCT Pub. No.: WO2018/223351
PCT Pub. Date: Dec. 13, 2018

(65) Prior Publication Data
US 2021/0367647 A1 Nov. 25, 2021

(51) Int. Cl.
*H04B 7/0456* (2017.01)
*H04B 7/06* (2006.01)

(52) U.S. Cl.
CPC ......... *H04B 7/0478* (2013.01); *H04B 7/0626* (2013.01); *H04B 7/0639* (2013.01)

(58) Field of Classification Search
CPC ... H04B 1/02; H04B 1/38; H04B 7/02; H04B 7/04; H04B 7/06; H04B 7/0417;
(Continued)

(56) References Cited

U.S. PATENT DOCUMENTS 8,743,992 B2 * 6/2014 Enescu ............. H04L 25/03936
375/267
9,698,887 B2    7/2017 Geirhofer et al.
(Continued)

FOREIGN PATENT DOCUMENTS

CN    105009626 A    10/2015
CN    105553532 A    5/2016
(Continued)

OTHER PUBLICATIONS

Samsung., et al., "WF on Type I and II CSI codebooks"[online], 3GPP TSG-RAN WG1 #89, R1-1709232, Hangzhou, China, May 15-19, 2017, 24 Pages, URL: https://www.3gpp.org/ftp/TSG_RAN/WG1_RL1/TSGR1_89/Docs/R1-1709232.zip.
(Continued)

*Primary Examiner* — Shawkat M Ali
(74) *Attorney, Agent, or Firm* — Qualcomm Incorporated

(57) ABSTRACT

Precoding matrix indicator (PMI) feedback for Type II channel state information (CSI) feedback in new radio (NR) multiple input, multiple output (MIMO) operations is discussed. According to various aspects, a user equipment (UE) determines a plurality of CSI feedback components and identifies a set of discarded ones of these components based on a particular component value of a precoding matrix indicator (PMI) component. The UE may then generate an adjusted CSI report by adjusting how the discarded feedback components are treated. The resulting adjusted CSI report may then be transmitted to a serving base station.

66 Claims, 8 Drawing Sheets

(58) Field of Classification Search
CPC .. H04B 7/0478; H04B 7/0626; H04B 7/0639; H04B 15/00; H04B 17/00; H04L 1/02; H04L 5/00; H04L 25/49; H04L 27/00; H04L 27/26; H04L 27/28; H04W 4/00; H04W 24/00; H04W 72/04; H04W 72/06; H04W 72/10
USPC ........ 370/252, 328, 329, 334, 335; 375/219, 375/224, 259, 260, 267, 295, 316; 455/91, 101, 115.1
See application file for complete search history.

(56) References Cited

U.S. PATENT DOCUMENTS

| | | | | |
|---|---|---|---|---|
| 2012/0140649 | A1* | 6/2012 | Choudhury | H04L 1/0027 370/252 |
| 2012/0218948 | A1* | 8/2012 | Onggosanusi | H04B 7/0486 370/329 |
| 2013/0258874 | A1* | 10/2013 | Khoshnevis | H04L 1/0031 370/252 |
| 2015/0063282 | A1 | 3/2015 | Kim et al. | |
| 2015/0341092 | A1 | 11/2015 | Park et al. | |
| 2016/0142117 | A1 | 5/2016 | Rahman et al. | |

FOREIGN PATENT DOCUMENTS

| | | |
|---|---|---|
| CN | 106506131 A | 3/2017 |
| JP | 2015185953 A | 10/2015 |
| JP | 2016513430 A | 5/2016 |
| WO | WO-2014138625 | 9/2014 |
| WO | WO-2015199588 A1 | 12/2015 |
| WO | WO-2016056981 A1 | 4/2016 |
| WO | WO-2016069632 A1 | 5/2016 |
| WO | 2017075803 A1 | 5/2017 |

OTHER PUBLICATIONS

Ericsson: "Codebook Design for Type II CSI Feedback", 3GPP Draft; R1-1708688, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051273871, 12 pages, Retrieved from the Internet: URL: http://www.3gpp.org/ftp/Meetings_3GPP_SYNC/RAN1/Docs/ [retrieved on May 14, 2017].

SAmsung: "Type II CSI Reporting", 3GPP Draft; R1-1707962; Type II CSI Reporting, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), XP051273160, 14 pages, Retrieved from the Internet: URL: http://www.3gpp.org/ftp/Meetings_3GPP_SYNC/RAN1/Docs/ [retrieved on May 14, 2017].

Supplementary European Search Report—EP17913024—Search Authority—Munich—dated Oct. 28, 2020.

International Search Report and Written Opinion—PCT/CN2017/087629—ISA/EPO—dated Feb. 22, 2018.

Taiwan Search Report—TW107119644—TIPO—dated Nov. 18, 2021.

* cited by examiner

PMI FEEDBACK FOR TYPE II CSI FEEDBACK IN NR-MIMO

CROSS REFERENCE

This application claims the benefit of PCT/CN2017/087629, entitled, "PMI FEEDBACK FOR TYPE II CSI FEEDBACK IN NR-MIMO" filed on Jun. 8, 2017, which is expressly incorporated by reference herein in its entirety.

BACKGROUND

Field

Aspects of the present disclosure relate generally to wireless communication systems, and more particularly, to precoding matrix indicator (PMI) feedback for Type II channel state information (CSI) feedback in new radio (NR) multiple input, multiple output (MIMO) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a UE, a plurality of channel state information (CSI) feedback components, identifying, by the UE, a set of discarded CSI feedback components of the plurality of CSI feedback components based on a component value of a precoding matrix indicator (PMI) component of the plurality of CSI feedback components, and generating, by the UE, an adjusted CSI report, wherein the adjusted CSI report includes the plurality of CSI feedback components adjusted according to the set of discarded CSI feedback components, and transmitting, by the UE, the adjusted CSI report to a serving base station.

In an additional aspect of the disclosure, an apparatus configured for wireless communication, includes means for determining, by a UE, a plurality of CSI feedback components, identifying, by the UE, a set of discarded CSI feedback components of the plurality of CSI feedback components based on a component value of a PMI component of the plurality of CSI feedback components, means for generating, by the UE, an adjusted CSI report, wherein the adjusted CSI report includes the plurality of CSI feedback components adjusted according to the set of discarded CSI feedback components, and means for transmitting, by the UE, the adjusted CSI report to a serving base station.

In an additional aspect of the disclosure, a non-transitory computer-readable medium having program code recorded thereon. The program code further includes code to determine, by a UE, a plurality of CSI feedback components, code to identify, by the UE, a set of discarded CSI feedback components of the plurality of CSI feedback components based on a component value of a PMI component of the plurality of CSI feedback components, code to generate, by the UE, an adjusted CSI report, wherein the adjusted CSI report includes the plurality of CSI feedback components adjusted according to the set of discarded CSI feedback components, and code to transmit, by the UE, the adjusted CSI report to a serving base station.

In an additional aspect of the disclosure, an apparatus configured for wireless communication is disclosed. The apparatus includes at least one processor, and a memory coupled to the processor. The processor is configured to determine, by a UE, a plurality of CSI feedback components, to identify, by the UE, a set of discarded CSI feedback components of the plurality of CSI feedback components based on a component value of a PMI component of the plurality of CSI feedback components, to generate, by the UE, an adjusted CSI report, wherein the adjusted CSI report includes the plurality of CSI feedback components adjusted according to the set of discarded CSI feedback components, and to transmit, by the UE, the adjusted CSI report to a serving base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
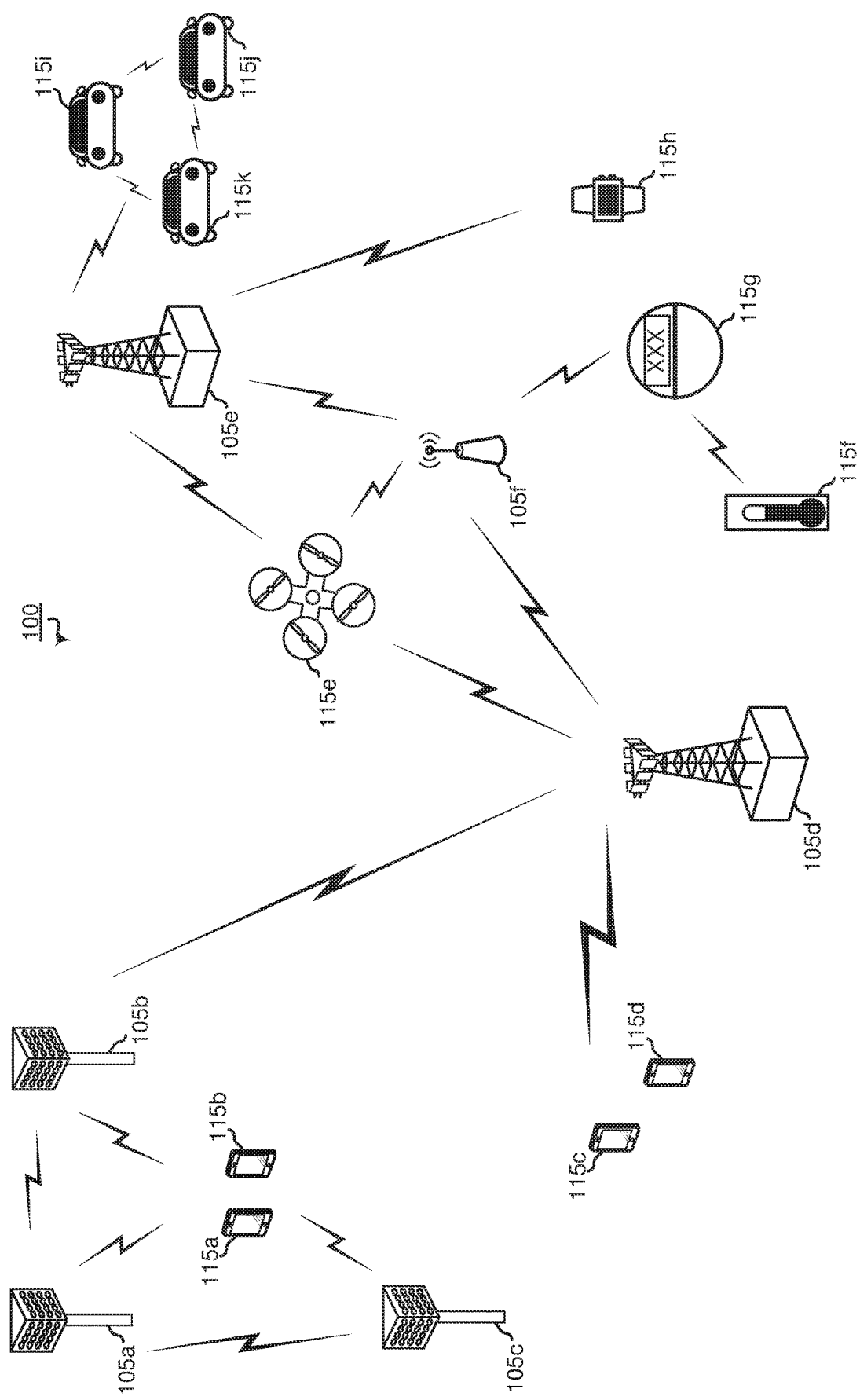
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
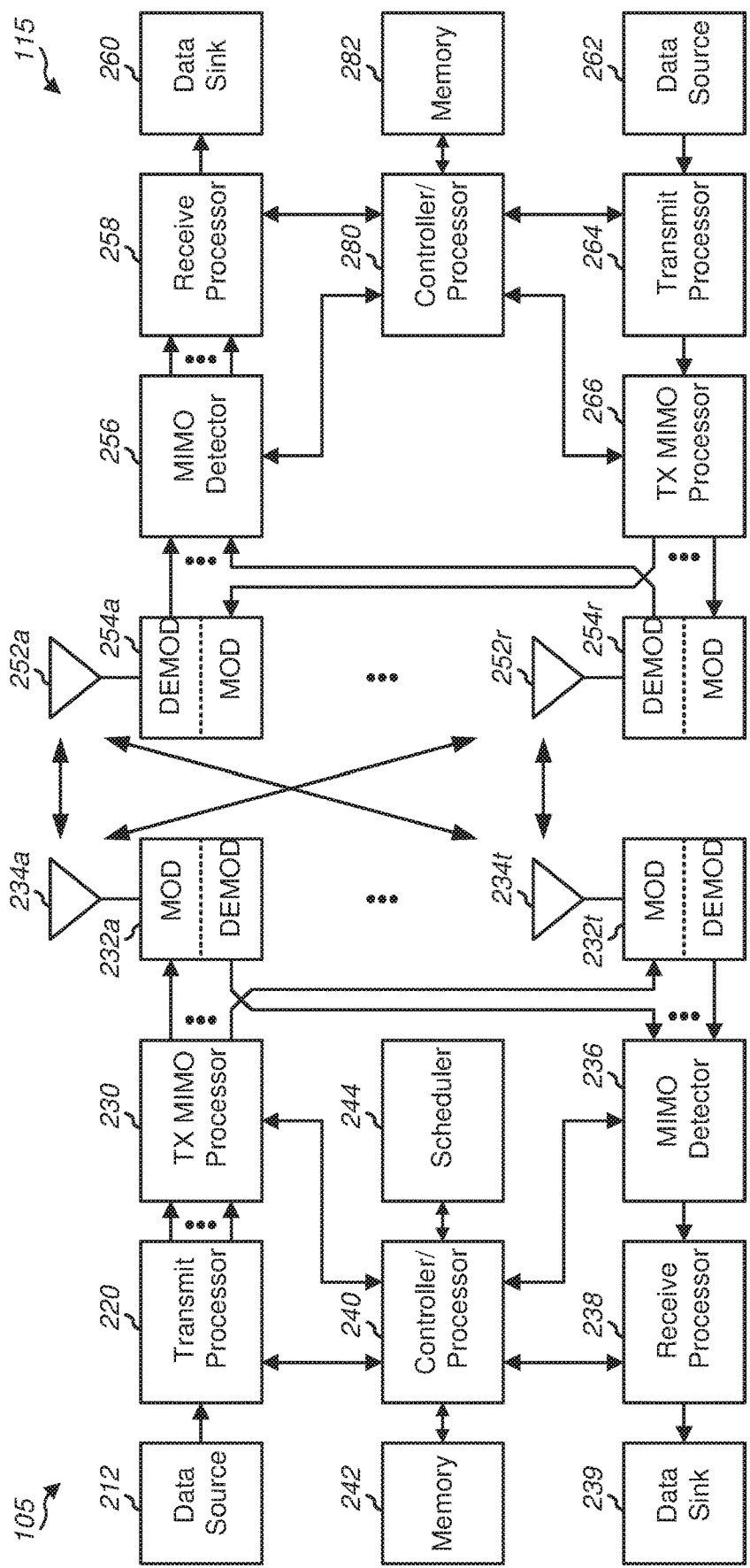
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
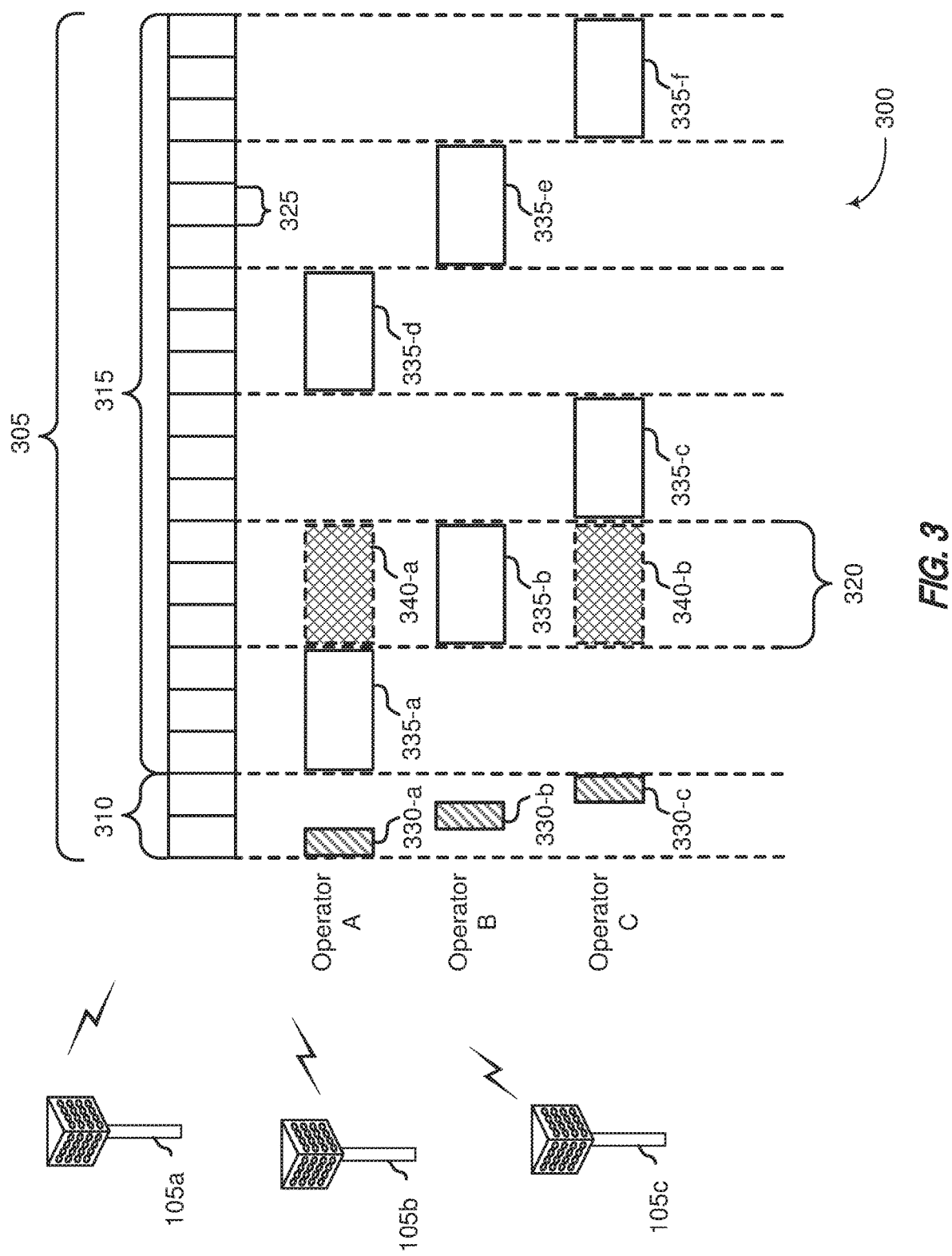
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

NR supports Type II category 1 CSI feedback reporting for ranks 1 and 2. Precoding matrix indicators (PMIs) are used for spatial channel information feedback. The PMI codebook assumes the following precoder structure:

For rank 1: $W = \begin{bmatrix} \tilde{w}_{0,0} \\ \tilde{w}_{1,0} \end{bmatrix} = W_1 W_2$, $W$ is normalized to 1

For rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2,$ columns of $W$ are normalized to $\frac{1}{\sqrt{2}}$ $\tilde{W}_{r,l} = \sum_{i=0}^{l-1} b_{k_1^{(i)} k_2^{(i)}} \cdot p_{r,l,i}^{(WB)} \cdot p_{r,l,i}^{(SB)} \cdot c_{r,l,i}$ (weighted combination of $L$ beams).

The value of L is configurable: $L \in \{2,3,4\}$, $b_{k1,k2}$ corresponds to an oversampled 2D DFT beam, $r=0, 1$ corresponds to the polarization of the beam, $l=0, 1$ corresponds to the layer, $p_{r,l,i}^{(WB)}$ corresponds to the wideband (WB) beam amplitude or power scaling factor for beam i and on polarization r and layer l, $p_{r,l,i}^{(SB)}$ corresponds to the subband (SB) beam amplitude or power scaling factor for beam i and on polarization r and layer l, $c_{r,l,i}$ corresponds to the beam combining coefficient or phase for beam i and on polarization r and layer l. The precoder may be configurable between QPSK (2 bits) and 8PSK (3 bits), and the amplitude scaling mode may be configurable between WB and SB (with unequal bit allocation) and WB-only.

Beam selection generally is performed for wideband only, in which the unconstrained beam selection is made from orthogonal basis:

$k_1^{(1)} = O_1 \cdot n_1^{(i)} + q_1,\ i=0, \ldots, L-1$ $k_2^{(1)} = O_2 \cdot n_2^{(i)} + q_2,\ i=0, \ldots, L-1$ where $q_1=0, \ldots, O_1-1$, $q_2=0, \ldots, O_2-1$ correspond to rotation factors; and $n_1^{(i)}=0, \ldots, N_1-1$, $n_2^{(i)}=0, \ldots, N_2-1$ correspond to orthogonal beam indices. The following values of $(N_1, N_2)$ and $(O_1, O_2)$ in Table 1 may be supported:

TABLE 1

| # of CSI-RS Ports | $(N_1, N_2)$ | $(O_1, O_2)$ |
|---|---|---|
| 4 (*) | (2, 1) | (4, —) |
| 8 (*) | (2, 2) | (4, 4) |
|  | (4, 1) | (4, —) |
| 12 | (3, 2) | (4, 4) |
|  | (6, 1) | (4, —) |
| 16 | (4, 2) | (4, 4) |
|  | (8, 1) | (4, —) |
| 24 | (6, 2) (4, 3) | (4, 4) |
|  | (12, 1) | (4, —) |
| 32 | (8, 2) (4, 4) | (4, 4) |
|  | (16, 1) | (4, —) |

(*) Beam selection may not be used for: 4-port L=2 (L=3, 4 may not be supported), 8-port L=4.

Amplitude scaling may be independently selected for each beam, polarization, and layer. A UE may be configured to report wideband amplitude with or without subband amplitude. For example, with wideband $p_{r,l,i}^{(WB)}$ and subband $p_{r,l,i}^{(SB)}$, $p_{0,0,i}^{(WB)} \neq p_{0,1,i}^{(WB)} \neq p_{1,0,i}^{(WB)} \neq p_{1,1,i}^{(WB)}$ and $p_{0,0,i}^{(SB)} \neq p_{0,1,i}^{(SB)} \neq p_{1,0,i}^{(SB)} \neq p_{1,1,i}^{(SB)}$ are possible. With a wideband $p_{r,l,i}^{(WB)}$ only configuration $p_{0,0,i}^{(WB)} \neq p_{0,1,i}^{(WB)} \neq p_{1,0,i}^{(WB)} \neq p_{1,1,i}^{(WB)}$ is possible. The wideband amplitude value set (3 bits) may include $\{1, \sqrt{0.5}, \sqrt{0.25}, \sqrt{0.125}, \sqrt{0.0625}, \sqrt{0.0313}, \sqrt{0.0156}, 0\}$. The PMI payload can vary depending on whether an amplitude is zero or not, while the subband amplitude value set (1 bit) may include $\{1, \sqrt{0.5}\}$.

Phase for combining coefficients may also be independently selected for each beam, polarization, and layer. In a subband only configuration, the phase value set may either include $e^{j\frac{\pi n}{2}},$ n=0, 1, 2, 3 (2 bits) or $e^{j\frac{\pi n}{4}},$ n=0, 1, . . . , 7 (3 bits).

The wideband amplitude, subband amplitude, and subband phase components for each of the beam, polarization, and layer values may then be quantized and reported in (X,Y,Z) bits. For each layer, for the leading (strongest) coefficient out of 2L coefficients, (X, Y, Z)=(0,0,0). The leading (strongest) coefficient=1.

For wideband and subband amplitude configurations, (X, Y)=(3,1) and $Z \in \{2,3\}$ for the first (K−1) leading (strongest) coefficients out of (2L−1) coefficients, and (X,Y,Z)=(3,0,2) for the remaining (2L−K) coefficients. For L=2, 3, and 4, the corresponding value of K may be 4 (=2L), 4, and 6, respectively. The following coefficient index information may reported in a wideband-only configuration. The index of strongest coefficient out of 2L coefficients (per layer). The (K−1) leading coefficients are determined implicitly from reported (2L−1) wideband amplitude coefficients per layer without additional signaling. For wideband-only amplitude, i.e. Y=0. (X, Y)=(3, 0) and $Z \in \{2,3\}$. The index of the strongest coefficient out of 2L coefficients is reported per layer in a wideband manner.

For NR networks, seven feedback components may be included for CSI reporting. Fewer or greater numbers of feedback components are also possible based on the particular codebook configurations. One example collection of such CSI feedback components are: (1) the rank indicator; (2) an indication of beam selection ($PMI_b$), wideband only, and inclusive of $PMI_{b,0}$ to $PMI_{b,L-1}$ for L beams, where L may be preconfigured, and an indication of a rotation factor selection ($PMI_q$); (3) a dominant beam index ($PMI_d$), for each layer, inclusive of $PMI_{d,l}$, (4) an indication of wideband amplitude ($PMI_{p,wb}$), for each layer and polarization, inclusive of $PMI_{p,wb,r,l,b}$ (where r is polarization and l is layer); (5) an indication of subband amplitude ($PMI_{p,sb}$), for each layer and polarization, inclusive of $PMI_{p,sb,r,l,b}$; (6) an indication of subband phase ($PMI_c$), for each layer and polarization, inclusive of $PMI_{c,r,l,b}$; and (7) the channel quality indicator (CQI), wideband or subband, where a single codeword is assumed for use in the CSI feedback. As noted, in some codebook configurations, $PMI_{p,sb}$ may not be a part of the CSI feedback components. Aspects of the present disclosure are directed to providing overhead reduction schemes.

Figure 4:
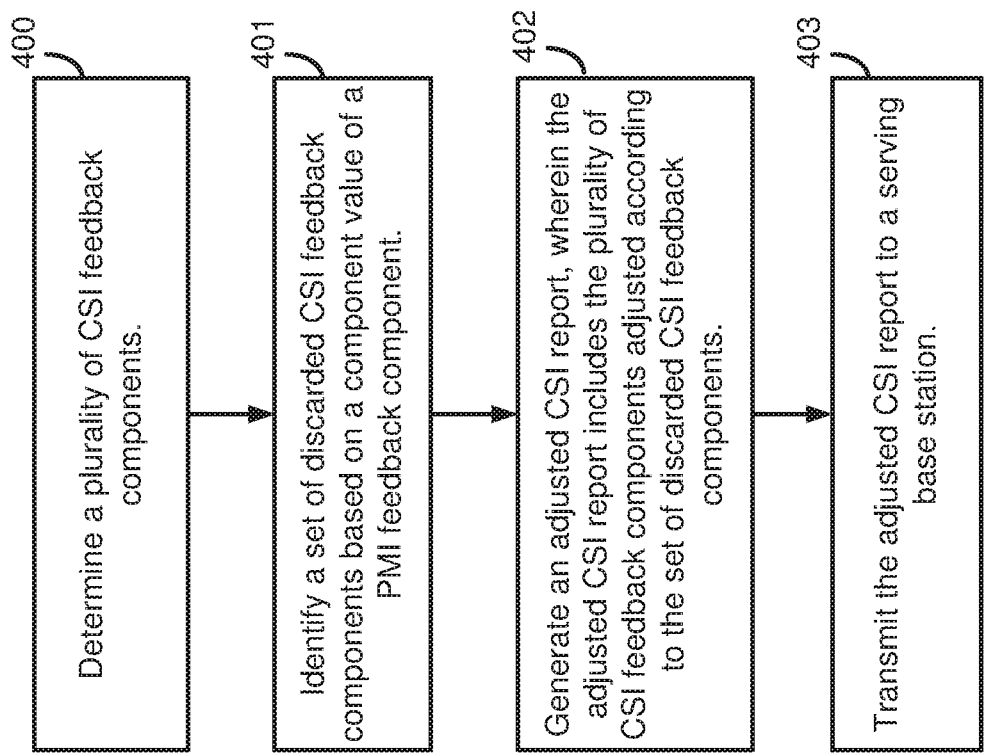
FIG. 4 is a block diagram illustrating example blocks executed to implement one aspect of the present disclosure.
Figure 8:
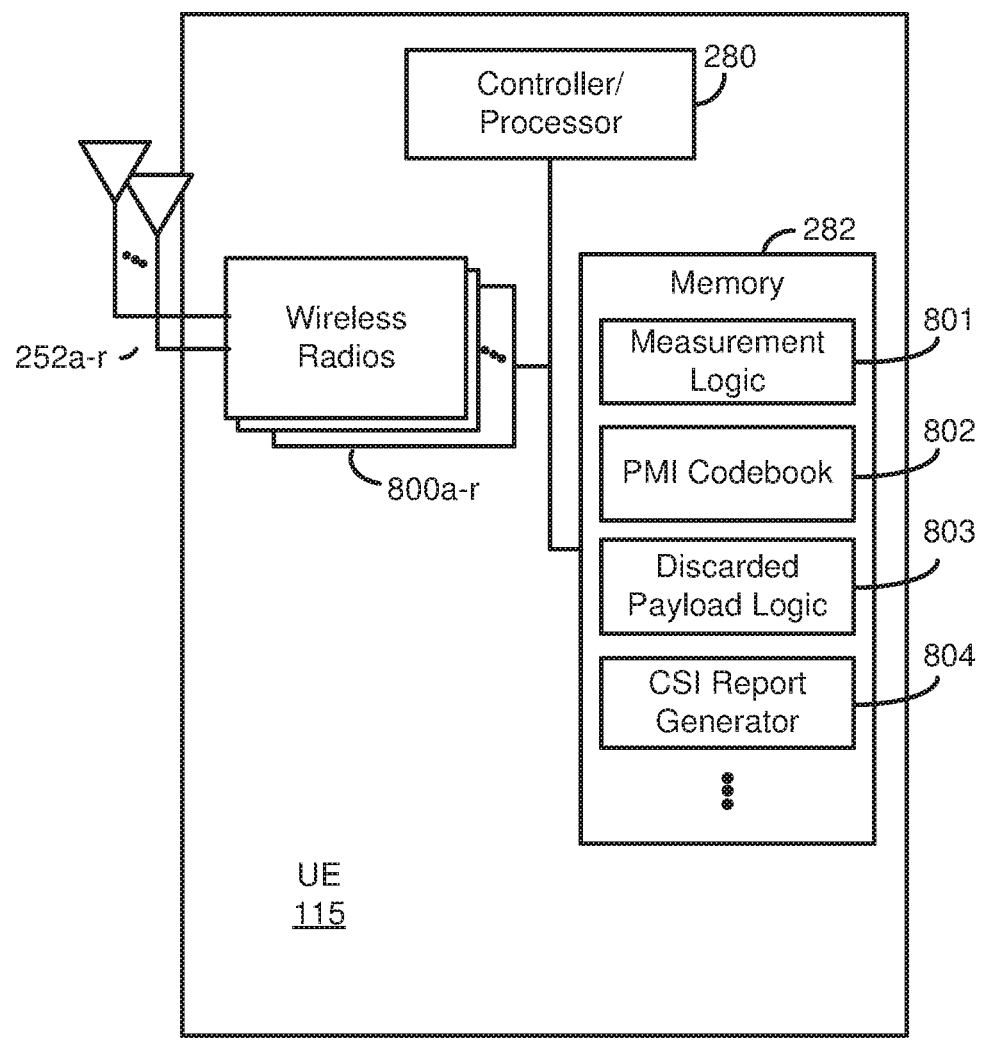
FIG. 8 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for eNB 105, including modulator/demodulators 254a-r, MIMO detector 256, receive processor 258, transmit processor 264, and TX MIMO processor 266.

At block 400, a UE may determine a plurality of CSI feedback components. For example, the UE, such as UE 115, may determine the number of CSI feedback components that would be defined based on the codebook configuration. Accordingly, UE 115, under control of controller/processor 280 would execute measurement logic 801, stored in memory 282. The execution environment of measurement logic 801 allows UE 115 to measure the channel environment around UE 115. The various CSI feedback components may then be determined by accessing PMI codebook 802, in memory 282, using the knowledge of the channel environment. In one example implementation, the seven CSI feedback components addressed above may include RI, $PMI_b$, $PMI_d$, $PMI_{p,wb}$, $PMI_{p,sb}$, $PMI_c$, and CQI, each of which, where applicable, is determined independently for each beam, polarization, and layer. At block 401, the UE identifies a set of discarded CSI feedback components based on a component value of a particular PMI feedback component. For example, UE 115, under control of controller/processor 280, executes discarded payload logic 803, stored in memory 282. The execution environment of discarded payload logic 803 allows UE 115 to identify ones of the determined CSI feedback components that will be considered discarded components based on the value of certain PMI feedback components. For instance, a value of one of the PMI feedback components, such as either $PMI_b$ or $PMI_{p,wb}$ may be used by UE 115 to determine which of the other CSI feedback components may be considered a discarded component. Thus, depending on which beam has been indicated by $PM_b$, UE 115 may determine which of the other PMI feedback components would be unnecessary for reporting. Similarly, by determine what the wideband amplitude value is of $PMI_{p,wb}$, UE 115 may also determine the other corresponding PMI feedback components that would be unnecessary to report. The particular PMI feedback component that will be used to identify the discarded component may be predetermined at UE 115, either through signaling, such as higher or lower layer signaling, or pre-configured UE settings. The various aspects for determining such discarded components will be discussed further below.

At block 402, the UE generates an adjusted CSI report, wherein the adjusted CSI report includes the plurality of CSI feedback components adjusted according to the set of discarded CSI feedback components. After determining which of the CSI feedback components may be discarded as not necessary for reporting, UE 115 executes CSI report generator 804, in memory 282, and generates the adjusted CSI report to accommodate for the discarded components. For example, as discussed further below, UE 115 may completely drop the discarded components from the CSI feedback report, or it may assign a fixed value associated with the discarded components. At block 403, the UE would then transmit the adjusted CSI report to the serving base station. For example, UE 115 would transmit the resulting adjusted CSI report via wireless radios 800a-r and antennas 252a-r.

Figure 5:
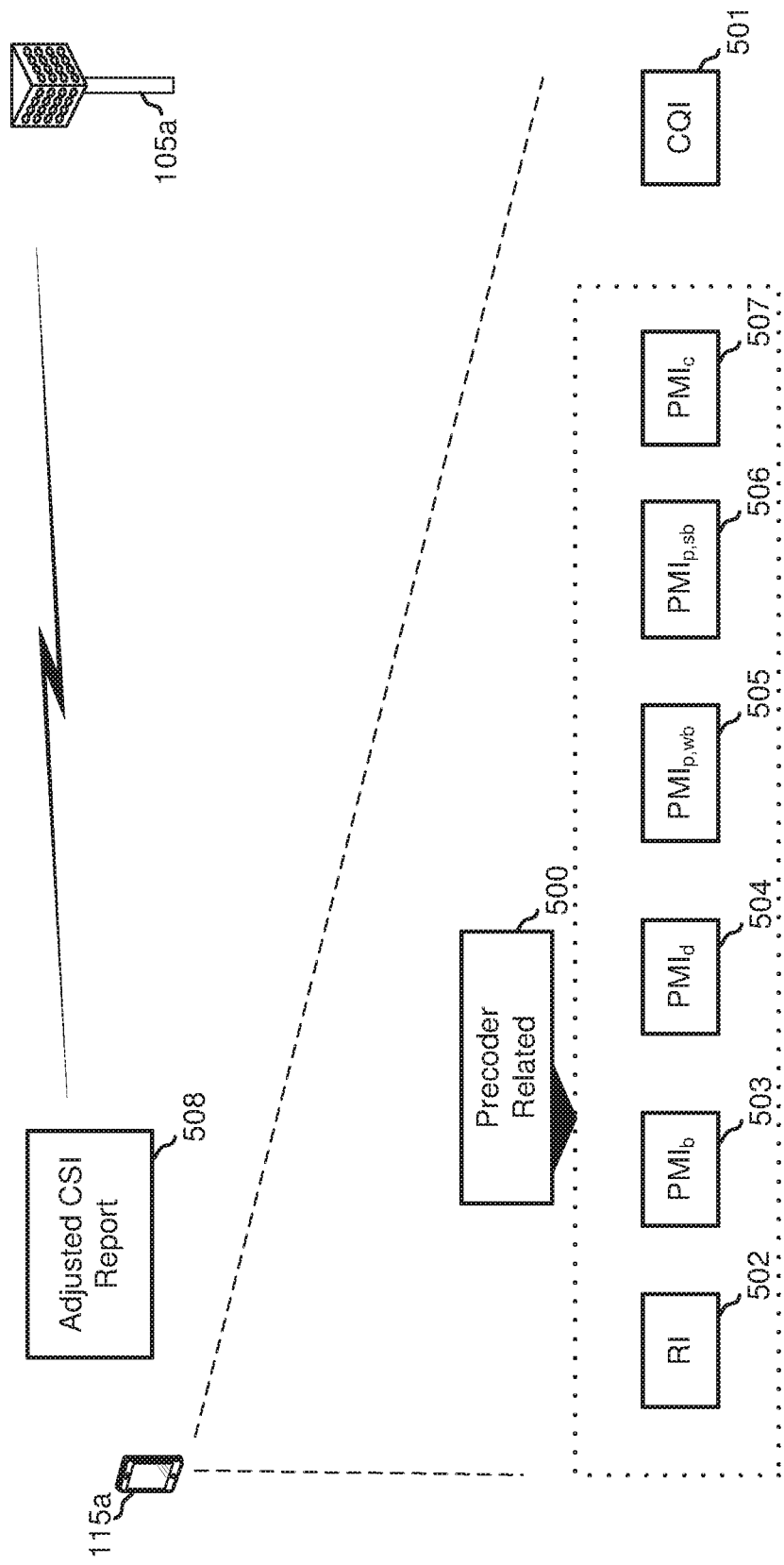
FIG. 5 is a block diagram illustrating a UE configured according to one aspect of the present disclosure.

FIG. 5 is a block diagram illustrating a UE 115a configured according to one aspect of the present disclosure. UE 115a would determine each of the CSI feedback components including precoder related components 500, which are used for determining the precoder (e.g., RI 502, $PMI_b$ 503, $PMI_d$ 504, $PMI_{p,wb}$ 505, $PMI_{p,sb}$ 506, and $PMI_c$ 507, and CQI 501. Various aspects of the present disclosure are directed to providing schemes for overhead reduction in such CSI reporting. For example, in a first optional aspect, the discarded components may be implicitly indicated through the beam indication of $PMI_b$ 503. For example, if $PMI_{b,n}$= $PMI_{b,0}$ (0<=n<L) then the associated feedback component of $PMI_{p,wb,r,l,b>=n}$, $PMI_{p,sb,\ r,l,b>=n}$, $PMI_{c,r,l,b>=n}$ may be regarded as "discarded payload" or discarded components. The effect is equivalent to falling back to L=n beams for the linear combination codebook. In a variation of this first option, if n=1, then the UE would fall back to a Type I CSI feedback, in which all of the other PMI components of $PMI_d$ 504, $PMI_{p,wb}$ 505, $PMI_{p,sb}$ 506, and $PMI_c$ 507, would be regarded as discarded components, and the PMI of the corresponding Type I codebook would, instead, be fed back to base station 105a.

In a second optional aspect, the discarded components may be implicitly indicated through the wideband amplitude $PMI_{p,wb}$ 505. For example, when $PMI_{p,w,b,r,l,n}$=0, then the associated feedback component of $PMI_{p,sb,r,l,n}$, $PMI_{c,r,l,n}$ may be regarded as discarded components. A third optional aspect may include jointly utilizing the first and second alternative options.

The different alternative schemes for overhead reduction may be triggered in various ways. For example, UE 115a may be triggered for overhead reduction through a pre-defined (e.g., always enabled) mechanism, or through signaling from base station 105a for enabling/disabling the various optional schemes via higher-layer configuration signaling, semi-static configuration signaling, or dynamic configuration signaling. Thus, both of the first and second alternative options can be enabled/disabled by signaling from base station 105a. For example, selection based on $PMI_b$ 503 may be enabled/disabled by semi-static configuration signaling from base station 105a, while the selection based on $PMI_{p,wb}$ 505 may always enabled.

The feedback components that are identified as discarded payload may be handled in different ways. In a first optional aspect, UE 115a may elect not to transmit any of the discarded components, thus, reducing the overall payload size. For example, if, based on $PMI_b$ 503, UE 115a identifies the polarization, beam, and layer components for $PMI_{p,wb}$ 505, $PMI_{p,sb}$ 506, and $PMI_c$ 507 as being discarded components, the generation of adjusted CSI report 508 would not include these components, in which the overall payload size of adjusted CSI report 508 would resultantly be reduced.

In a second optional aspect, UE 115a may transmit adjusted CSI report 508 with a fixed payload. The fixed payload may, for example, consist of all '0's or another predefined pattern when the components are identified as discarded components. For example, if, based on $PMI_{p,wb}$ 505, UE 115a identifies the polarization, beam, and layer components for $PMI_{p,sb}$ 506, and $PMI_c$ 507 as being discarded components, the generation of adjusted CSI report 508 would include the fixed payload associated with the discarded components, in which the overall payload size of adjusted CSI report 508 would remain the same. The consistent payload size would also make further joint encoding possible.

Figure 6:
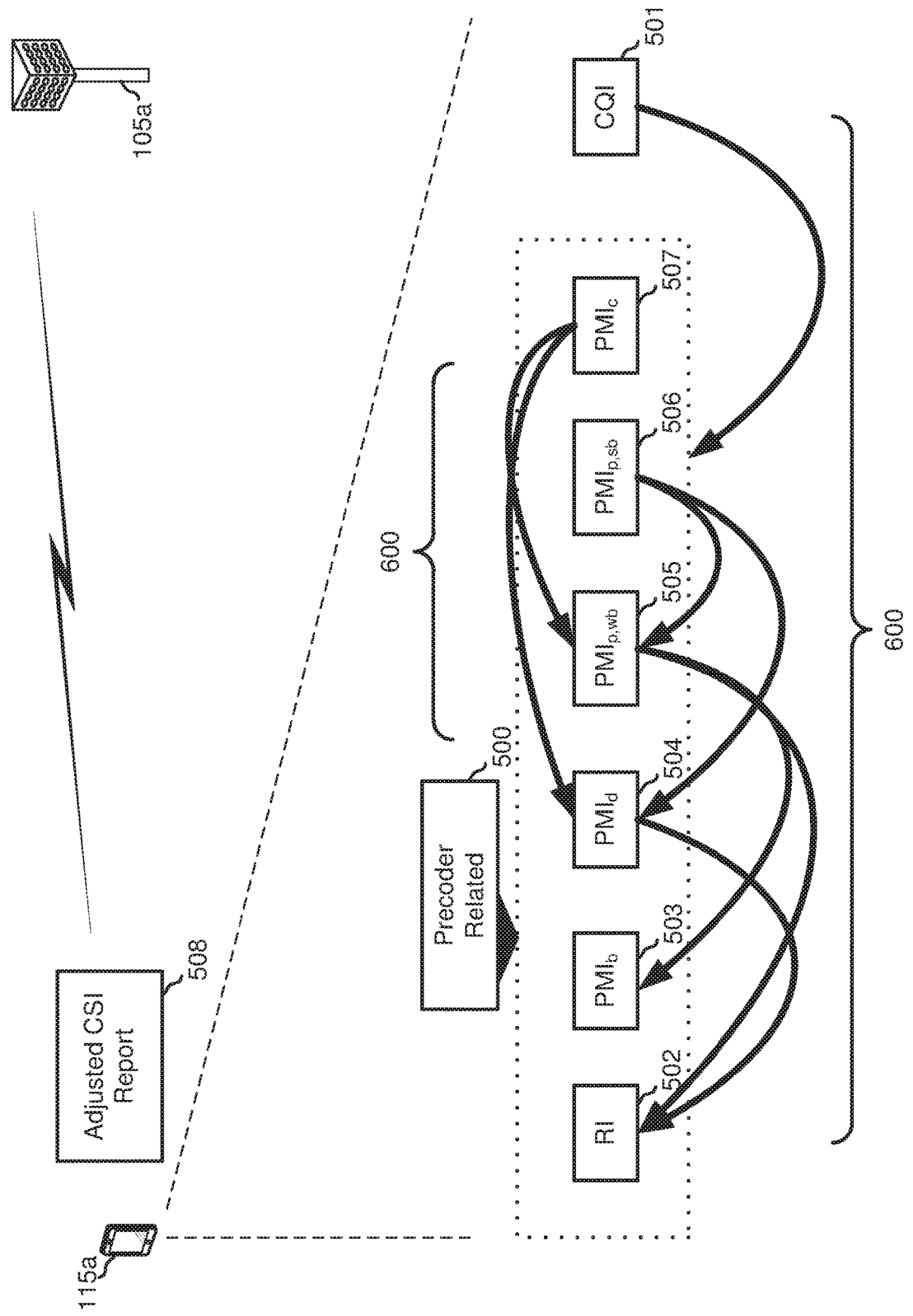
FIG. 6 is a block diagram illustrating a UE configured according to one aspect of the present disclosure.

FIG. 6 is a block diagram illustrating a UE 115a configured according to one aspect of the present disclosure. In additional aspects of the present disclosure, certain CSI feedback components of CSI feedback may be dependent on correct decoding of other CSI feedback components. Dependency in the context of CSI feedback means that the component is effective only when the other component depended upon is decoded correctly. Dependency arrows 600 identify which of the precoder related components 500 have such dependency on other CSI feedback components. For example, effective $PMI_d$ 504 may depend on the correct decoding of the rank indicator, RI 502. Effective $PMI_{p,wb}$ 505 may depend on the correct decoding of RI 50 and $PMI_b$ 503 (where the overhead reduction scheme selection is based on $PMI_b$ 503). Effective $PMI_{p,sb}$ 506 and $PMI_c$ 507 may depend on the correct decoding of $PMI_d$ 504 and $PMI_{p,wb}$ 505 (where the overhead reduction scheme selection is based on $PMI_{p,wb\ 505}$). Additionally, effective CQI 501 may depend on constructed precoder related components 500 (which includes RI 502 and all of the PMI components, $PMI_b$ 503, $PMI_d$ 504, $PMI_{p,wb}$ 505, $PMI_{p,sb}$ 506, and $PMI_c$ 507.

Figure 7A:
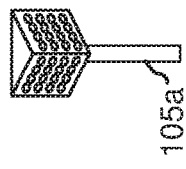
FIGS. 7A-7C are block diagrams illustrating a UE configured according to aspects of the present disclosure.
Figure 7A:
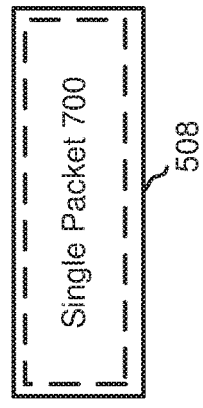
Figure 7A:
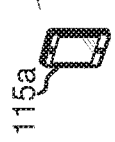
Figure 7B:
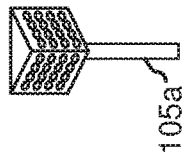
Figure 7B:
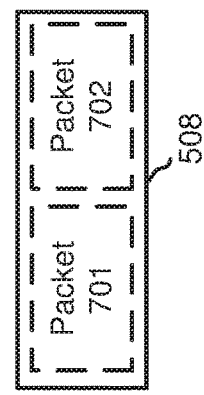
Figure 7B:
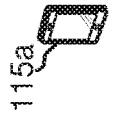
Figure 7C:
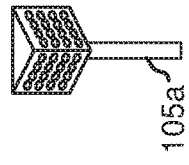
Figure 7C:
Figure 7C:

FIGS. 7A-7C are block diagrams illustrating a UE 115a configured according to aspects of the present disclosure. Additional aspects of the present disclosure provide for joint coding of the CSI feedback components. The relationship between the joint coding and treatment of discarded bits may be defined such that when the payload bits can be determined based on previous decoded components, then the reduced payload option may be applied. However, when the payload bits cannot be determined based on the previous decoded components (such as when the widebank amplitude-based selection option is enabled and $PMI_{p,wb}$ 505 and $PMI_{p,sb}$ 506 are encoded in one packet, where the size of $PMI_{p,sb}$ 506 has dependency with $PMI_{p,wb}$ 505), then the fixed payload option may be used. The various joint coding schemes available in the aspects of the present disclosure may be selected dependent on whether the reduced payload option or fixed payload option is used for the overhead savings.

Joint coding schemes for CSI feedback may provide single packet (FIG. 7A), two packet (FIG. 7B), or three packet transmissions (FIG. 7C). In the first joint coding option of FIG. 7A, a single packet 700 may be encoded in adjusted CSI report 508 for CSI feedback. In such aspects, all of CSI feedback components (e.g., RI 502, $PMI_b$ 503, $PMI_d$ 504, $PMI_{p,wb}$ 505, $PMI_{p,sb}$ 506, and $PMI_c$ 507, and CQI 501) would be encoded in single packet 700. The fixed payload option may be used when either the beam selection-based or wideband amplitude-based selection options for discarded components is enabled.

In the second joint coding option of FIG. 7B, two packet encoding (packet 701 and packet 702) in adjusted CSI report 508 may include two different sub-options. Various aspects of this two-packet encoding implementation may provide for any variety of pairings of CSI feedback components between packet 701 and packet 702. In one example of a first sub-option, RI 502 and $PMI_b$ 503 may be encoded in packet 701, while $PMI_d$ 504, $PMI_{p,wb}$ 505, $PMI_{p,sb}$ 506, and $PMI_c$ 507 may be encoded in packet 702. If the wideband amplitude-based selection option is enabled, then the fixed payload option may be used for packet 702. However, if the beam indication-based selection option is enabled and the wideband amplitude-based selection option is disabled, the reduced payload option may be used for packet 702.

In one example of a second sub-option of the second joint coding option of FIG. 7B, RI 502, $PMI_b$ 503, $PMI_d$ 504, and $PMI_{p,wb}$ 505 may be encoded in packet 701, while $PMI_{p,sb}$ 506 and $PMI_c$ 507 may be encoded in packet 702. If the beam indication-based selection option is enabled, the reduced payload option may be used for packet 701 ($PMI_{p,wb}$ 505 depends on $PMI_b$ 503). Whenever either the beam indication-based selection option or the wideband amplitude-based selection option are enabled, the reduced payload option may be used for packet 702.

In a third joint coding option of FIG. 7C, three packet encoding provides for encoding of the CSI feedback components into three packets (packet 703, packet 704, and packet 705) in adjusted CSI report 508. In one example implementation RI 502 and $PMI_b$ 503 are encoded in packet 703, $PMI_d$ 504, $PMI_{p,wb}$ 505 are encoded into packet 704, and $PMI_{p,sb}$ 506 and $PMI_c$ 507 are encoded into packet 705. UE 115a may use the reduced payload option for encoding packets 704 and 705, when either of the beam indication-based selection option or wideband amplitude-based selection option are enabled.

In another example implementation illustrated through FIG. 7C, the pairings of CSI feedback components may include RI 502 encoded by itself into packet 703, $PMI_b$ 503, $PMI_d$ 504, and $PMI_{p,wb}$ 505 encoded into packet 704, and $PMI_{p,sb}$ 506 and $PMI_c$ 507 encoded into packet 705. In such implementation, the fixed payload option for encoding packets 703 and 704, when either of the beam indication-based selection option or wideband amplitude-based selection option are enabled, with the reduced payload option being available for encoding packet 705 may be used.

It should be noted that with regard to the different example pairings described for the joint coding options of FIGS. 7A-7C, each packet of the different options may include different CSI feedback components for the joint encoding. The aspects of the present disclosure are not limited only to the described example pairings.

In additional aspects, when a CSI-RS resource indicator (CRI) is to be jointly encoded into CSI feedback of adjusted CSI report 508, it may be placed in first packet (e.g., single packet 700, packet 701, or packet 703, respectively). When CQI 501 is to be jointly encoded in CSI feedback of adjusted CSI report 508, it may either be carried in the first packet (e.g., single packet 700, packet 701, or packet 703, respectively), or in the last packet (e.g., packet 702 or packet 705, respectively).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   generating, by a user equipment (UE), an adjusted channel state information (CSI) report, wherein the adjusted CSI report includes a first plurality of CSI feedback components adjusted according to a set of discarded CSI feedback components, wherein the set of discarded CSI feedback components is identified based on a component value of a precoding matrix indicator (PMI) component of a second plurality of CSI feedback components, and wherein the second plurality of CSI feedback components comprises the first plurality of CSI feedback components and the set of discarded CSI feedback components; and
   transmitting, by the UE, the adjusted CSI report to a serving base station.

2. The method of claim 1, wherein the PMI component includes:
   a beam indication precoding matrix indicator ($PMI_b$);
   a wideband amplitude precoding matrix indicator ($PMI_{p,wb}$); or
   a combination thereof.

3. The method of claim 2, further comprising:
   identifying, by the UE, the set of discarded CSI feedback components of the second plurality of CSI feedback components based on the component value of the PMI component of the second plurality of CSI feedback components, wherein the identifying the set of discarded CSI feedback components includes one of:
   identifying as the set of discarded CSI feedback components the $PMI_{p,wb}$, a subband amplitude PMI ($PMI_{p,sb}$), and a phase PMI ($PMI_c$) for each polarization and each layer of each beam of a plurality of available beams greater than an identified beam corresponding to the component value of the $PMI_b$; or
   identifying as the set of discarded CSI feedback components a dominant beam indication PMI ($PMI_d$), the $PMI_{p,wb}$, the $PMI_{p,sb}$, and the $PMI_c$ for each of the plurality of available beams.

4. The method of claim 2, further comprising:
   identifying, by the UE, the set of discarded CSI feedback components of the second plurality of CSI feedback components based on the component value of the PMI component of the second plurality of CSI feedback components, wherein the identifying the set of discarded CSI feedback components includes:

identifying as the set of discarded CSI feedback components a subband amplitude PMI ($PMI_{p,sb}$), and a phase PMI ($PMI_c$) for each polarization and each layer of an identified beam corresponding to the component value of the $PMI_{p,wb}$.

5. The method of claim 2, further including:
selecting, by the UE, the PMI component as one of: the $PMI_b$, or the $PMI_{p,wb}$, wherein the selecting is determined according to one of:
a predetermined configuration;
a trigger signal to enable the selected PMI component; or
a modification signal to disable a current PMI component and to enable the selected PMI component.

6. The method of claim 2, wherein the generating the adjusted CSI report includes:
generating a set of adjusted CSI components, wherein the set of adjusted CSI components includes one of:
the second plurality of CSI feedback components without the set of discarded CSI feedback components; or
the second plurality of CSI feedback components in which the set of discarded CSI feedback components are replaced with a fixed component value associated with the set of discarded CSI feedback components.

7. The method of claim 6, wherein the generating the adjusted CSI report further includes:
jointly encoding the set of adjusted CSI components into one of: a single packet, two packets, or three packets.

8. The method of claim 7,
wherein the set of adjusted CSI components are generated without the set of discarded CSI feedback components when the set of adjusted CSI components are determined based on decoding one or more of the second plurality of CSI feedback components, and
wherein the set of adjusted CSI components include the fixed component value when the set of adjusted CSI components are not determined based on the decoding.

9. The method of claim 7, wherein the set of adjusted CSI components include the fixed component value when the set of CSI components are jointly encoded into the single packet.

10. The method of claim 7,
wherein the set of CSI components are jointly encoded into the two packets with a rank indicator and the $PMI_b$ jointly encoded into a first packet and a dominant beam PMI ($PMI_d$), the $PMI_{p,wb}$, an amplitude subband PMI ($PMI_{p,sb}$), a phase PMI ($PMI_c$) jointly encoded in a second packet, and
wherein one of:
the set of adjusted CSI components include the fixed component value when the PMI component corresponds to the $PMI_{p,wb}$; or
the set of adjusted CSI components are generated without the set of discarded CSI feedback components when the PMI component corresponds to the $PMI_b$.

11. The method of claim 7,
wherein the set of CSI components are jointly encoded into the two packets with a rank indicator, the $PMI_b$, a dominant beam PMI ($PMI_d$), and the $PMI_{p,wb}$, jointly encoded into a first packet and an amplitude subband PMI ($PMI_{p,sb}$), and a phase PMI ($PMI_c$) jointly encoded in a second packet, and
wherein the rank indicator, the $PMI_b$, the $PMI_d$, and the $PMI_{p,wb}$, are jointly encoded in the first packet without the set of discarded CSI feedback components when the PMI component corresponds to the $PMI_b$ and the $PMI_{p,sb}$ and the $PMI_c$ are jointly encoded in the second packet without the set of discarded CSI feedback components when the PMI component corresponds to one of: the $PMI_{p,wb}$ or the $PMI_b$.

12. The method of claim 7,
wherein the set of CSI components are jointly encoded into the three packets with a rank indicator and the $PMI_b$ jointly encoded into a first packet, a dominant beam PMI ($PMI_d$) and the $PMI_{p,wb}$ jointly encoded into a second packet, and an amplitude subband PMI ($PMI_{p,sb}$) and a phase PMI ($PMI_c$) jointly encoded in a third packet, and
wherein the $PMI_d$ and the $PMI_{p,wb}$ are jointly encoded in the second packet without the set of discarded CSI feedback components and the $PMI_{p,sb}$ and the $PMI_c$ are jointly encoded in the third packet without the set of discarded CSI feedback components when the PMI component corresponds to one of: the $PMI_{p,wb}$ or the $PMI_b$.

13. The method of claim 7,
wherein the set of CSI components are jointly encoded into the three packets with a rank indicator encoded into a first packet, the $PMI_b$, a dominant beam PMI ($PMI_d$), and the $PMI_{p,wb}$ jointly encoded into a second packet, and an amplitude subband PMI ($PMI_{p,sb}$) and a phase PMI ($PMI_c$) jointly encoded in a third packet, and
wherein, when the PMI component corresponds to one of: the $PMI_{p,wb}$ or the $PMI_b$, the rank indicator is encoded in the first packet and the $PMI_b$, the $PMI_d$, and the $PMI_{p,wb}$ are jointly encoded in the second packet are replaced with a fixed component value, and the $PMI_{p,sb}$ and the $PMI_c$ are jointly encoded in the third packet without the set of discarded CSI feedback components.

14. The method of claim 7,
wherein the set of adjusted CSI components includes a CSI reference signal (CSI-RS) resource indicator (CRI), and
wherein the CRI is jointly encoded in a first packet of the one of: the single packet, the two packets, or the three packets.

15. The method of claim 7,
wherein the set of adjusted CSI components includes a channel quality indicator (CQI), and
wherein the CQI is jointly encoded into one of a first packet or a last packet of the one of:
the single packet, the two packets, or the three packets.

16. The method of claim 1, wherein the second plurality of CSI feedback components includes:
rank indicator;
a beam indication precoding matrix indicator ($PMI_b$);
a dominant beam indication PMI ($PMI_d$);
a wideband amplitude precoding matrix indicator ($PMI_{p,wb}$);
a subband amplitude PMI ($PMI_{p,sb}$);
a phase PMI ($PMI_c$) for each polarization;
a channel quality indicator (CQI); or
a combination thereof.

17. The method of claim 1, further comprising generating, by the UE, the second plurality of CSI feedback components.

18. The method of claim 1, further comprising identifying, by the UE, the set of discarded CSI feedback components of the second plurality of CSI feedback components based on the component value of the PMI component of the second plurality of CSI feedback components.

19. The method of claim 1, wherein generating the adjusted CSI report includes:

generating, by the UE, a CSI feedback report, wherein the CSI feedback report includes the second plurality of CSI feedback components; and removing, by the UE, the set of discarded CSI feedback components from the CSI feedback report to generate the adjusted CSI report comprising the first plurality of CSI components.

20. The method of claim 1, further comprising prior to generating the adjusted CSI report, generating, by the UE, a CSI feedback report, wherein the CSI feedback report includes the second plurality of CSI feedback components.

21. The method of claim 20, further comprising measuring, by the UE, a channel environment proximate to the UE to determine the second plurality of CSI feedback components.

22. An apparatus configured for wireless communication, the apparatus comprising:
means for generating, by a user equipment (UE), an adjusted channel state information (CSI) report, wherein the adjusted CSI report includes a first plurality of CSI feedback components adjusted according to a set of discarded CSI feedback components, wherein the set of discarded CSI feedback components is identified based on a component value of a precoding matrix indicator (PMI) component of a second plurality of CSI feedback components, and wherein the second plurality of CSI feedback components comprises the first plurality of CSI feedback components and the set of discarded CSI feedback components; and
means for transmitting, by the UE, the adjusted CSI report to a serving base station.

23. The apparatus of claim 22, wherein the PMI component includes :
a beam indication precoding matrix indicator ($PMI_b$);
a wideband amplitude precoding matrix indicator ($PMI_{p,wb}$); or a combination thereof.

24. The apparatus of claim 23, further comprising:
means for identifying, by the UE, the set of discarded CSI feedback components of the second plurality of CSI feedback components based on the component value of the PMI component of the second plurality of CSI feedback components, wherein the means for identifying the set of discarded CSI feedback components includes:
means for identifying as the set of discarded CSI feedback components a subband amplitude PMI ($PMI_{p,sb}$), and a phase PMI ($PMI_c$) for each polarization and each layer of an identified beam corresponding to the component value of the $PMI_{p,wb}$.

25. The apparatus of claim 23, further including:
means for selecting, by the UE, the PMI component as one of: the $PMI_b$, or the $PMI_{p,wb}$, wherein the means for selecting is determined according to one of:
a predetermined configuration;
a trigger signal to enable the selected PMI component; or
a modification signal to disable a current PMI component and to enable the selected PMI component.

26. The apparatus of claim 23, wherein the means for generating the adjusted CSI report includes:
means for generating a set of adjusted CSI components, wherein the set of adjusted CSI components includes one of:
the second plurality of CSI feedback components without the set of discarded CSI feedback components; or
the second plurality of CSI feedback components in which the set of discarded CSI feedback components are replaced with a fixed component value associated with the set of discarded CSI feedback components.

27. The apparatus of claim 26, wherein the means for generating the adjusted CSI report further includes:
means for jointly encoding the set of adjusted CSI components into one of: a single packet, two packets, or three packets.

28. The apparatus of claim 27,
wherein the set of adjusted CSI components are generated without the set of discarded CSI feedback components when the set of adjusted CSI components are determined based on decoding one or more of the second plurality of CSI feedback components, and
wherein the set of adjusted CSI components include the fixed component value when the set of adjusted CSI components are not determined based on the decoding.

29. The apparatus of claim 27, wherein the set of adjusted CSI components include the fixed component value when the set of CSI components are jointly encoded into the single packet.

30. The apparatus of claim 27,
wherein the set of CSI components are jointly encoded into the two packets with a rank indicator and the $PMI_b$ jointly encoded into a first packet and a dominant beam PMI ($PMI_d$), the $PMI_{p,wb}$, an amplitude subband PMI ($PMI_{p,sb}$), a phase PMI ($PMI_c$) jointly encoded in a second packet, and
wherein one of:
the set of adjusted CSI components include the fixed component value when the PMI component corresponds to the $PMI_{p,wb}$; or
the set of adjusted CSI components are generated without the set of discarded CSI feedback components when the PMI component corresponds to the $PMI_b$.

31. The apparatus of claim 27,
wherein the set of CSI components are jointly encoded into the two packets with a rank indicator, the $PMI_b$, a dominant beam PMI ($PMI_d$), and the $PMI_{p,wb}$ jointly encoded into a first packet and an amplitude subband PMI ($PMI_{p,sb}$), and a phase PMI ($PMI_c$) jointly encoded in a second packet, and
wherein the rank indicator, the $PMI_b$, the $PMI_d$, and the $PMI_{p,wb}$ are jointly encoded in the first packet without the set of discarded CSI feedback components when the PMI component corresponds to the $PMI_b$ and the $PMI_{p,sb}$ and the $PMI_c$ are jointly encoded in the second packet without the set of discarded CSI feedback components when the PMI component corresponds to one of: the $PMI_{p,wb}$ or the $PMI_b$.

32. The apparatus of claim 27,
wherein the set of CSI components are jointly encoded into the three packets with a rank indicator and the $PMI_b$ jointly encoded into a first packet, a dominant beam PMI ($PMI_d$) and the $PMI_{p,wb}$ jointly encoded into a second packet, and an amplitude subband PMI ($PMI_{p,sb}$) and a phase PMI ($PMI_c$) jointly encoded in a third packet, and
wherein the $PMI_d$ and the $PMI_{p,wb}$ are jointly encoded in the second packet without the set of discarded CSI feedback components and the $PMI_{p,sb}$ and the $PMI_c$ are jointly encoded in the third packet without the set of discarded CSI feedback components when the PMI component corresponds to one of: the $PMI_{p,wb}$ or the $PMI_b$.

33. The apparatus of claim 27,
wherein the set of CSI components are jointly encoded into the three packets with a rank indicator encoded into a first packet, the $PMI_b$, a dominant beam PMI ($PMI_d$), and the $PMI_{p,wb}$ jointly encoded into a second packet, and an amplitude subband PMI ($PMI_{p,sb}$) and a phase PMI ($PMI_c$) jointly encoded in a third packet, and
wherein, when the PMI component corresponds to one of: the $PMI_{p,wb}$ or the $PMI_b$, the rank indicator is encoded in the first packet and the $PMI_b$, the $PMI_d$, and the $PMI_{p,wb}$ are jointly encoded in the second packet are replaced with a fixed component value, and the $PMI_{p,sb}$ and the $PMI_c$ are jointly encoded in the third packet without the set of discarded CSI feedback components.

34. The apparatus of claim 27,
wherein the set of adjusted CSI components includes a CSI reference signal (CSI-RS) resource indicator (CRI), and
wherein the CRI is jointly encoded in a first packet of the one of: the single packet, the two packets, or the three packets.

35. The apparatus of claim 27,
wherein the set of adjusted CSI components includes a channel quality indicator (CQI), and
wherein the CQI is jointly encoded into one of a first packet or a last packet of the one of: the single packet, the two packets, or the three packets.

36. A non-transitory computer-readable medium having program code recorded thereon, the program code comprising:
program code executable by the computer for causing the computer to generate, by a user equipment (UE), an adjusted channel state information (CSI) report, wherein the adjusted CSI report includes a first plurality of CSI feedback components adjusted according to a set of discarded CSI feedback components, wherein the set of discarded CSI feedback components is identified based on a component value of a precoding matrix indicator (PMI) component of a second plurality of CSI feedback components, and wherein the second plurality of CSI feedback components comprises the first plurality of CSI feedback components and the set of discarded CSI feedback components; and
program code executable by a computer for causing the computer to transmit, by the UE, the adjusted CSI report to a serving base station.

37. The non-transitory computer-readable medium of claim 36, wherein the PMI component includes one of:
a beam indication precoding matrix indicator ($PMI_b$);
a wideband amplitude precoding matrix indicator ($PMI_{p,wb}$); or
a combination thereof.

38. The non-transitory computer-readable medium of claim 36, further comprising:
program code executable by a computer for causing the computer to identify, by the UE, the set of discarded CSI feedback components of the second plurality of CSI feedback components based on the component value of the PMI component of the second plurality of CSI feedback components, wherein the program code executable by the computer for causing the computer to identify the set of discarded CSI feedback components includes one of:
program code executable by the computer for causing the computer to identify as the set of discarded CSI feedback components the $PMI_{p,wb}$, a subband amplitude PMI ($PMI_{p,sb}$), and a phase PMI ($PMI_c$) for each polarization and each layer of each beam of a plurality of available beams greater than an identified beam corresponding to the component value of the $PMI_b$; or
program code executable by the computer for causing the computer to identify as the set of discarded CSI feedback components a dominant beam indication PMI ($PMI_d$), the $PMI_{p,wb}$, the $PMI_{p,sb}$, and the $PMI_c$ for each of the plurality of available beams.

39. The non-transitory computer-readable medium of claim 37, further comprising:
program code executable by a computer for causing the computer to identify, by the UE, the set of discarded CSI feedback components of the second plurality of CSI feedback components based on the component value of the PMI component of the second plurality of CSI feedback components, wherein the program code executable by the computer for causing the computer to identify the set of discarded CSI feedback parameters includes:
program code executable by the computer for causing the computer to identify as the set of discarded CSI feedback components a subband amplitude PMI ($PMI_{p,sb}$), and a phase PMI ($PMI_c$) for each polarization and each layer of an identified beam corresponding to the component value of the $PMI_{p,wb}$.

40. The non-transitory computer-readable medium of claim 37, further including:
program code executable by the computer for causing the computer to select, by the UE, the PMI component as one of: the $PMI_b$, or the $PMI_{p,wb}$, wherein the program code executable by the computer for causing the computer to select is determined according to one of:
a predetermined configuration;
a trigger signal to enable the selected PMI component; or
a modification signal to disable a current PMI component and to enable the selected PMI component.

41. The non-transitory computer-readable medium of claim 37, wherein the program code executable by the computer for causing the computer to generate the adjusted CSI report includes:
program code executable by the computer for causing the computer to generate a set of adjusted CSI components, wherein the set of adjusted CSI components includes one of:
the second plurality of CSI feedback components without the set of discarded CSI feedback components; or
the second plurality of CSI feedback components in which the set of discarded CSI feedback components are replaced with a fixed component value associated with the set of discarded CSI feedback components.

42. The non-transitory computer-readable medium of claim 41, wherein the program code executable by the computer for causing the computer to generate the adjusted CSI report further includes:
program code executable by the computer for causing the computer to jointly encode the set of adjusted CSI components into one of: a single packet, two packets, or three packets.

43. The non-transitory computer-readable medium of claim 42,
wherein the set of adjusted CSI components are generated without the set of discarded CSI feedback components when the set of adjusted CSI components are determined based on decoding one or more of the second plurality of CSI feedback components, and wherein the set of adjusted CSI components include the fixed component value when the set of adjusted CSI components are not determined based on the decoding.

44. The non-transitory computer-readable medium of claim 42, wherein the set of adjusted CSI components include the fixed component value when the set of CSI components are jointly encoded into the single packet.

45. The non-transitory computer-readable medium of claim 42,
wherein the set of CSI components are jointly encoded into the two packets with a rank indicator and the $PMI_b$ jointly encoded into a first packet and a dominant beam PMI ($PMI_d$), the $PMI_{p,wb}$, an amplitude subband PMI ($PMI_{p,sb}$), a phase PMI ($PMI_c$) jointly encoded in a second packet, and
wherein one of:
the set of adjusted CSI components include the fixed component value when the PMI component corresponds to the $PMI_{p,wb}$; or
the set of adjusted CSI components are generated without the set of discarded CSI feedback components when the PMI component corresponds to the $PMI_b$.

46. The non-transitory computer-readable medium of claim 42,
wherein the set of CSI components are jointly encoded into the two packets with a rank indicator, the $PMI_b$, a dominant beam PMI ($PMI_d$), and the $PMI_{p,wb}$ jointly encoded into a first packet and an amplitude subband PMI ($PMI_{p,sb}$), and a phase PMI ($PMI_c$) jointly encoded in a second packet, and
wherein the rank indicator, the $PMI_b$, the $PMI_d$, and the $PMI_{p,wb}$ are jointly encoded in the first packet without the set of discarded CSI feedback components when the PMI component corresponds to the $PMI_b$ and the $PMI_{p,sb}$ and the $PMI_c$ are jointly encoded in the second packet without the set of discarded CSI feedback components when the PMI component corresponds to one of: the $PMI_{p,wb}$ or the $PMI_b$.

47. The non-transitory computer-readable medium of claim 42,
wherein the set of CSI components are jointly encoded into the three packets with a rank indicator and the $PMI_b$ jointly encoded into a first packet, a dominant beam PMI ($PMI_d$) and the $PMI_{p,wb}$ jointly encoded into a second packet, and an amplitude subband PMI ($PMI_{p,sb}$) and a phase PMI ($PMI_c$) jointly encoded in a third packet, and
wherein the $PMI_d$ and the $PMI_{p,wb}$ are jointly encoded in the second packet without the set of discarded CSI feedback components and the $PMI_{p,sb}$ and the $PMI_c$ are jointly encoded in the third packet without the set of discarded CSI feedback components when the PMI component corresponds to one of: the $PMI_{p,wb}$ or the $PMI_b$.

48. The non-transitory computer-readable medium of claim 42,
wherein the set of CSI components are jointly encoded into the three packets with a rank indicator encoded into a first packet, the $PMI_b$, a dominant beam PMI ($PMI_d$), and the $PMI_{p,wb}$ jointly encoded into a second packet, and an amplitude subband PMI ($PMI_{p,sb}$) and a phase PMI ($PMI_c$) jointly encoded in a third packet, and
wherein, when the PMI component corresponds to one of: the $PMI_{p,wb}$ or the $PMI_b$, the rank indicator is encoded in the first packet and the $PMI_b$, the $PMI_d$, and the $PMI_{p,wb}$ are jointly encoded in the second packet are replaced with a fixed component value, and the $PMI_{p,sb}$ and the $PMI_c$ are jointly encoded in the third packet without the set of discarded CSI feedback components.

49. The non-transitory computer-readable medium of claim 42,
wherein the set of adjusted CSI components includes a CSI reference signal (CSI-RS) resource indicator (CRI), and
wherein the CRI is jointly encoded in a first packet of the one of: the single packet, the two packets, or the three packets.

50. An apparatus configured for wireless communication, the apparatus comprising:
at least one processor; and
a memory coupled to the at least one processor,
wherein the at least one processor is configured:
to generate an adjusted channel state information (CSI) report, wherein the adjusted CSI report includes a first plurality of CSI feedback components adjusted according to a set of discarded CSI feedback components, wherein the set of discarded CSI feedback components based is identified based on a component value of a precoding matrix indicator (PMI) component of a second plurality of CSI feedback components, and wherein the second plurality of CSI feedback components comprises the first plurality of CSI feedback components and the set of discarded CSI feedback components; and
to transmit the adjusted CSI report to a serving base station.

51. The apparatus of claim 50, wherein the PMI component includes one of:
a beam indication precoding matrix indicator ($PMI_b$);
a wideband amplitude precoding matrix indicator ($PMI_{p,wb}$); or
a combination thereof.

52. The apparatus of claim 51, wherein the at least one processor is further configured to identify the set of discarded CSI feedback components based on the component value of the PMI component of the second plurality of CSI feedback components,
wherein the configuration of the at least one processor to identify the set of discarded CSI feedback components includes configuration of the at least one processor to one of:
identify as the set of discarded CSI feedback components the $PMI_{p,wb}$, a subband amplitude PMI ($PMI_{p,sb}$), and a phase PMI ($PMI_c$) for each polarization and each layer of each beam of a plurality of available beams greater than an identified beam corresponding to the component value of the $PMI_b$; or
identify as the set of discarded CSI feedback components a dominant beam indication PMI ($PMI_d$), the $PMI_{p,wb}$, the $PMI_{p,sb}$, and the $PMI_c$ for each of the plurality of available beams.

53. The apparatus of claim 51, wherein the at least one processor is further configured to identify the set of discarded CSI feedback components based on the component value of the PMI component of the second plurality of CSI feedback components,
wherein the configuration of the at least one processor to identify the set of discarded CSI feedback parameters includes configuration to identify as the set of discarded CSI feedback components a subband amplitude PMI ($PMI_{p,sb}$), and a phase PMI ($PMI_c$) for each polarization and each layer of an identified beam corresponding to the component value of the $PMI_{p,wb}$.

54. The apparatus of claim 51, further including configuration of the at least one processor to select, by the UE, the PMI component as one of: the $PMI_b$, or the $PMI_{p,wb}$, wherein the configuration of the at least one processor to select is determined according to one of:
   a predetermined configuration;
   a trigger signal to enable the selected PMI component; or
   a modification signal to disable a current PMI component and to enable the selected PMI component.

55. The apparatus of claim 51, wherein the configuration of the at least one processor to generate the adjusted CSI report includes configuration to generate a set of adjusted CSI components, wherein the set of adjusted CSI components includes one of:
   the second plurality of CSI feedback components without the set of discarded CSI feedback components; or
   the second plurality of CSI feedback components in which the set of discarded CSI feedback components are replaced with a fixed component value associated with the set of discarded CSI feedback components.

56. The apparatus of claim 55, wherein the configuration of the at least one processor to generate the adjusted CSI report further includes configuration to jointly encode the set of adjusted CSI components into one of: a single packet, two packets, or three packets.

57. The apparatus of claim 56,
   wherein the set of adjusted CSI components are generated without the set of discarded CSI feedback components when the set of adjusted CSI components are determined based on decoding one or more of the second plurality of CSI feedback components, and
   wherein the set of adjusted CSI components include the fixed component value when the set of adjusted CSI components are not determined based on the decoding.

58. The apparatus of claim 56, wherein the set of adjusted CSI components include the fixed component value when the set of CSI components are jointly encoded into the single packet.

59. The apparatus of claim 56,
   wherein the set of CSI components are jointly encoded into the two packets with a rank indicator and the $PMI_b$ jointly encoded into a first packet and a dominant beam PMI ($PMI_d$), the $PMI_{p,wb}$, an amplitude subband PMI ($PMI_{p,sb}$), a phase PMI ($PMI_c$) jointly encoded in a second packet, and
   wherein one of:
      the set of adjusted CSI components include the fixed component value when the PMI component corresponds to the $PMI_{p,wb}$; or
      the set of adjusted CSI components are generated without the set of discarded CSI feedback components when the PMI component corresponds to the $PMI_b$.

60. The apparatus of claim 56,
   wherein the set of CSI components are jointly encoded into the two packets with a rank indicator, the $PMI_b$, a dominant beam PMI ($PMI_d$), and the $PMI_{p,wb}$ jointly encoded into a first packet and an amplitude subband PMI ($PMI_{p,sb}$), and a phase PMI ($PMI_c$) jointly encoded in a second packet, and
   wherein the rank indicator, the $PMI_b$, the $PMI_d$, and the $PMI_{p,wb}$ are jointly encoded in the first packet without the set of discarded CSI feedback components when the PMI component corresponds to the $PMI_b$ and the $PMI_{p,sb}$ and the $PMI_c$ are jointly encoded in the second packet without the set of discarded CSI feedback components when the PMI component corresponds to one of: the $PMI_{p,wb}$ or the $PMI_b$.

61. The apparatus of claim 56,
   wherein the set of CSI components are jointly encoded into the three packets with a rank indicator and the $PMI_b$ jointly encoded into a first packet, a dominant beam PMI ($PMI_d$) and the $PMI_{p,wb}$ jointly encoded into a second packet, and an amplitude subband PMI ($PMI_{p,sb}$) and a phase PMI ($PMI_c$) jointly encoded in a third packet, and
   wherein the $PMI_d$ and the $PMI_{p,wb}$ are jointly encoded in the second packet without the set of discarded CSI feedback components and the $PMI_{p,sb}$ and the $PMI_c$ are jointly encoded in the third packet without the set of discarded CSI feedback components when the PMI component corresponds to one of: the $PMI_{p,wb}$ or the $PMI_b$.

62. The apparatus of claim 56,
   wherein the set of CSI components are jointly encoded into the three packets with a rank indicator encoded into a first packet, the $PMI_b$, a dominant beam PMI ($PMI_d$), and the $PMI_{p,wb}$ jointly encoded into a second packet, and an amplitude subband PMI ($PMI_{p,sb}$) and a phase PMI ($PMI_c$) jointly encoded in a third packet, and
   wherein, when the PMI component corresponds to one of: the $PMI_{p,wb}$ or the $PMI_b$, the rank indicator is encoded in the first packet and the $PMI_b$, the $PMI_d$, and the $PMI_{p,wb}$ are jointly encoded in the second packet are replaced with a fixed component value, and the $PMI_{p,sb}$ and the $PMI_c$ are jointly encoded in the third packet without the set of discarded CSI feedback components.

63. The apparatus of claim 56,
   wherein the set of adjusted CSI components includes a CSI reference signal (CSI-RS) resource indicator (CRI), and
   wherein the CRI is jointly encoded in a first packet of the one of: the single packet, the two packets, or the three packets.

64. The apparatus of claim 56,
   wherein the set of adjusted CSI components includes a channel quality indicator (CQI), and
   wherein the CQI is jointly encoded into one of a first packet or a last packet of the one of: the single packet, the two packets, or the three packets.

65. The apparatus of claim 50, wherein the second plurality of CSI feedback components includes:
   rank indicator;
   a beam indication precoding matrix indicator ($PMI_b$);
   a dominant beam indication PMI ($PMI_d$);
   a wideband amplitude precoding matrix indicator ($PMI_{p,wb}$);
   a subband amplitude PMI ($PMI_{p,sb}$);
   a phase PMI (PMIS) for each polarization;
   a channel quality indicator (CQI); or
   a combination thereof.

66. The apparatus of claim 50, where the at least one processor is further configured to:
   determine the second plurality of CSI feedback components; and
   identify the set of discarded CSI feedback components of the second plurality of CSI feedback components based on the component value of the PMI component of the second plurality of CSI feedback components.

* * * * *